United States Patent
Dagen et al.

(10) Patent No.: US 10,667,277 B2
(45) Date of Patent: May 26, 2020

(54) SYSTEMS AND METHODS FOR INTEGRATED SECURITY ACCESS CONTROL FOR VIDEO AND AUDIO STREAMING

(71) Applicant: Lenel Systems International, Inc., Pittsford, NY (US)

(72) Inventors: Justin Dagen, Pittsford, NY (US); Jason Higley, East Rochester, NY (US)

(73) Assignee: Lenel Systems International, Inc., Pittsford, NY (US)

( * ) Notice: Subject to any disclaimer, the term of this patent is extended or adjusted under 35 U.S.C. 154(b) by 179 days.

(21) Appl. No.: 14/908,649

(22) PCT Filed: Jun. 17, 2014

(86) PCT No.: PCT/US2014/042692
§ 371 (c)(1),
(2) Date: Jan. 29, 2016

(87) PCT Pub. No.: WO2015/017036
PCT Pub. Date: Feb. 5, 2015

(65) Prior Publication Data
US 2016/0165620 A1 Jun. 9, 2016

Related U.S. Application Data

(60) Provisional application No. 61/859,587, filed on Jul. 29, 2013.

(51) Int. Cl.
*H04L 29/06* (2006.01)
*H04W 72/10* (2009.01)
(Continued)

(52) U.S. Cl.
CPC ...... *H04W 72/10* (2013.01); *G08B 13/19656* (2013.01); *G08B 13/19667* (2013.01);
(Continued)

(58) Field of Classification Search
None
See application file for complete search history.

(56) References Cited

U.S. PATENT DOCUMENTS 5,579,239 A 11/1996 Freeman et al.
5,684,716 A 11/1997 Freeman
(Continued)

FOREIGN PATENT DOCUMENTS

KR 20040089911 A 10/2004
KR 20060030773 A 4/2006
(Continued)

OTHER PUBLICATIONS

International Search Report and Written Opinion dated Oct. 8, 2014 for International Application No. PCT/US2014/042692.

*Primary Examiner* — Natisha D Cox
(74) *Attorney, Agent, or Firm* — Locke Lord LLP; Scott D. Wofsy; Joshua L. Jones

(57) ABSTRACT

A security server in a communication network determines a number of available channels for a plurality of mobile devices and allocates one channel of the available channels to one of the mobile devices based on at least one priority parameter. The security server further receives data including at least one of audio data and video data from the one mobile device over the one channel and transmits the audio data and/or video data to at least one different device configured to display the audio data and/or video data.

15 Claims, 3 Drawing Sheets

(51) Int. Cl.
  *G08B 13/196* (2006.01)
  *H04L 29/08* (2006.01)

(52) U.S. Cl.
  CPC .......... *H04L 65/4076* (2013.01); *H04L 67/10* (2013.01); *H04L 67/125* (2013.01); *G08B 13/19645* (2013.01)

(56) References Cited

U.S. PATENT DOCUMENTS

| | | | |
|---|---|---|---|
| 6,522,352 B1 | 2/2003 | Strandwitz et al. | |
| 7,098,788 B2 | 8/2006 | Giraldo et al. | |
| 7,155,202 B2 | 12/2006 | Helal | |
| 7,221,386 B2 | 5/2007 | Thacher et al. | |
| 7,385,624 B2 | 6/2008 | Takehara et al. | |
| 7,424,282 B2 | 9/2008 | Barbeau | |
| 7,508,418 B2 | 3/2009 | Renkis | |
| 7,602,421 B2 | 10/2009 | Hunter et al. | |
| 7,719,567 B2 | 5/2010 | Renkis | |
| 7,719,571 B2 | 5/2010 | Renkis | |
| 7,728,871 B2 | 6/2010 | Renkis | |
| 7,730,534 B2 | 6/2010 | Renkis | |
| 7,784,080 B2 | 8/2010 | Renkis | |
| 7,821,533 B2 | 10/2010 | Renkis | |
| 7,860,994 B2 | 12/2010 | Rensin et al. | |
| 7,877,502 B2 | 1/2011 | Rensin et al. | |
| 7,925,293 B2 | 4/2011 | Mock et al. | |
| 7,936,370 B2 | 5/2011 | Renkis | |
| 7,944,484 B2 | 5/2011 | Strandwitz et al. | |
| 7,949,730 B2 | 5/2011 | Rensin et al. | |
| 7,954,129 B2 | 5/2011 | Renkis | |
| 8,041,829 B2 | 10/2011 | Rensin et al. | |
| 8,078,696 B2 | 12/2011 | LaJoie et al. | |
| 8,199,195 B2 | 6/2012 | Renkis | |
| 8,208,019 B2 | 6/2012 | Renkis | |
| 8,244,043 B2 | 8/2012 | Chang et al. | |
| 8,249,646 B2 | 8/2012 | Mock et al. | |
| 8,253,796 B2 | 8/2012 | Renkis | |
| 8,280,982 B2 | 10/2012 | La Joie et al. | |
| 8,321,901 B2 | 11/2012 | Westbrook et al. | |
| 8,341,246 B2 | 12/2012 | LaJoie et al. | |
| 8,368,754 B2 | 2/2013 | Flores et al. | |
| 8,438,243 B2 | 5/2013 | LaJoie et al. | |
| 8,457,314 B2 | 6/2013 | Renkis | |
| 8,627,388 B2 * | 1/2014 | Wood | H04N 21/25808 709/231 |
| 2003/0193395 A1 * | 10/2003 | Ahiska | G08B 25/08 340/540 |
| 2006/0048286 A1 * | 3/2006 | Donato | A42B 3/042 2/422 |
| 2006/0064477 A1 | 3/2006 | Renkis | |
| 2006/0095539 A1 | 5/2006 | Renkis | |
| 2006/0251259 A1 | 11/2006 | Renkis | |
| 2008/0084473 A1 * | 4/2008 | Romanowich | G08B 13/19671 348/135 |
| 2008/0244409 A1 | 10/2008 | Millar et al. | |
| 2009/0170472 A1 * | 7/2009 | Chapin | H04W 28/18 455/410 |
| 2010/0004017 A1 * | 1/2010 | Kikuchi | H04B 7/0645 455/522 |
| 2010/0023531 A1 | 1/2010 | Brisebois et al. | |
| 2010/0110206 A1 | 5/2010 | Strandwitz et al. | |
| 2010/0190480 A1 * | 7/2010 | Zheng | G08B 13/19621 455/414.1 |
| 2010/0220188 A1 | 9/2010 | Renkis | |
| 2010/0248771 A1 * | 9/2010 | Brewer | H04W 72/10 455/518 |
| 2010/0328461 A1 | 12/2010 | Renkis | |
| 2011/0039514 A1 | 2/2011 | Patnaik et al. | |
| 2011/0294490 A1 | 12/2011 | Faenger | |
| 2011/0310247 A1 | 12/2011 | Rensin et al. | |
| 2011/0319051 A1 | 12/2011 | Reitnour | |
| 2012/0105632 A1 | 5/2012 | Renkis | |
| 2012/0162421 A1 * | 6/2012 | Iwamura | G08B 13/19656 348/143 |
| 2012/0173746 A1 * | 7/2012 | Salinger | H04L 41/5019 709/230 |
| 2012/0173905 A1 * | 7/2012 | Diab | H04L 12/66 713/320 |
| 2012/0276954 A1 * | 11/2012 | Kowalsky | H04N 5/2252 455/556.2 |
| 2013/0007788 A1 | 1/2013 | Levinson et al. | |
| 2013/0170442 A1 | 7/2013 | Jung | |
| 2015/0358573 A1 * | 12/2015 | Kardashov | H04N 5/76 348/552 |

FOREIGN PATENT DOCUMENTS

| | | |
|---|---|---|
| KR | 20110000843 A | 1/2011 |
| KR | 20110138049 A | 12/2011 |

* cited by examiner

SYSTEMS AND METHODS FOR INTEGRATED SECURITY ACCESS CONTROL FOR VIDEO AND AUDIO STREAMING

RELATED APPLICATIONS

This application claims the benefit of and priority to U.S. Provisional Patent Application No. 61/859,587 filed Jul. 29, 2013, the contents of which are incorporated herein by reference in their entirety.

BACKGROUND

1. Field of the Invention

The present disclosure relates to security technologies, and more particularly, to security systems with streaming video and/or audio.

2. Description of the Related Art

Conventional security systems provide fixed, hard-wired cameras integrated with enterprise access control platforms for a given facility or site. However, such conventional security systems typically include non-monitored or poorly monitored areas (e.g., "dead zones") that do not have video coverage. Additionally, such conventional security systems typically do not include audio recording coverage for a majority of the facility due to prohibitive costs.

Security service professionals such as police officers that respond to emergencies at these facilities may have specialized recording equipment (e.g., a dash mounted camera), however such specialized recording equipment is typically limited in mobility (e.g., fixed to a vehicle dashboard) and is traditionally not integrated with the conventional enterprise access control platforms of the particular facility or site.

Although such conventional security systems have generally been considered satisfactory for their intended purpose, there is still a need in the art for improved security systems, methods and devices that allows for improved security monitoring.

SUMMARY

According to certain embodiments of the present invention, techniques described herein provide for an integrated security server that determines a number of available channels for a plurality of devices (e.g., mobile devices) in a communication network and allocates one channel of the available channels to one of the mobile devices based on at least one priority parameter such as a location, a user-specified priority, a position of a user in an organization, a bandwidth of the communication network, an emergency code, and an event-driven priority elevation, and the like. The integrated security server further receives data including at least one of the audio data and video data from the one mobile device over the one channel and transmits the audio data and the video data to a different device capable of displaying the video and audio (e.g., a different mobile device, a video and alarm monitoring station at a Security Operations Center (SOC), a computer, etc.).

In certain embodiments, the integrated security server further deallocates the one channel from the one mobile device to cause the one mobile device to store audio data and video data locally.

In certain embodiments, the integrated security server transmits a recording command from the security server to the one mobile device to cause the one mobile device to record and transmit audio data and video data to the security server.

Moreover, in some embodiments, the integrated security server receives global positioning system (GPS) data. When the integrated security server transmits the audio data and/or the video data to the at least one different device, the at least one different displays the audio data and/or the video data with a map overlay displaying the GPS data.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

A component or a feature that is common to more than one drawing is indicated with the same reference number in each of the drawings.

DESCRIPTION OF EXAMPLE EMBODIMENTS

Overview

According to one or more embodiments of the disclosure, the techniques discussed herein provide for integrated access to video and audio streaming for multiple monitoring devices. With respect to the monitoring devices, the techniques provide for capturing and pushing, real-time monitoring data (e.g., video and audio data, etc.) from resident onboard electronics (e.g., cameras and microphones, and the like). The captured data is dynamically encoded and pushed from the monitoring device to a central server for storage, subsequent display, and/or for broadcast to additional devices for display. The central server employs techniques to receive the captured data and dynamically allocate one or more channels to additional devices for subsequent display based on various criteria, as discussed herein (e.g., a total number of available licenses, available bandwidth, locations of particular devices, etc.). The embodiments and techniques discussed herein are employed in communication networks and use various communication protocols, as appreciated by those skilled in the art.

Description

A communication network is a geographically distributed collection of nodes interconnected by communication links and segments for transporting data between end nodes, such as personal computers and workstations, or other devices, such as sensors. Many types of networks are available, ranging from local area networks (LANs), wide area networks (WANs), to radio access networks (RANs). LANs typically connect the nodes over dedicated private communications links located in the same general physical location, such as a building or campus. WANs and RANs, on the other hand, typically connect geographically dispersed nodes over long-distance communications links, such as common carrier telephone lines, mobile telecommunications infrastructure, optical lightpaths, synchronous optical networks (SONET), synchronous digital hierarchy (SDH) links, or Powerline Communications (PLC) such as IEEE 61334, IEEE P1901.2, and others.

Figure 1:
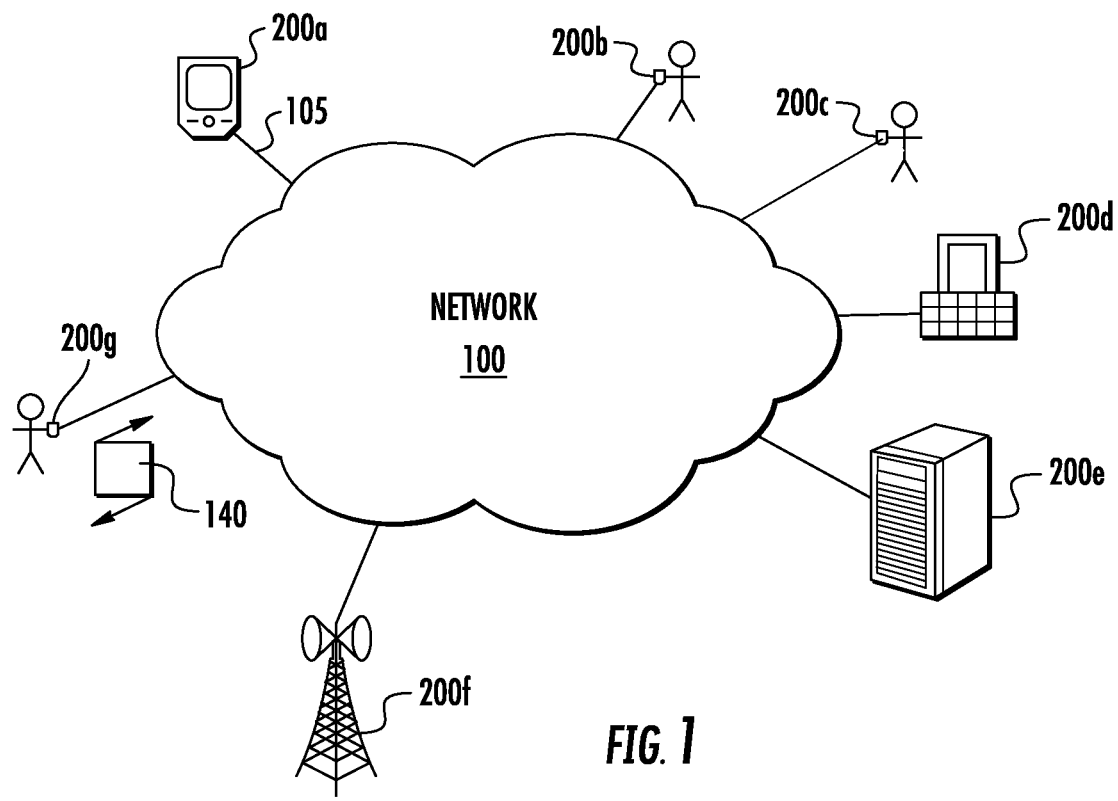
FIG. 1 is a schematic diagram of an exemplary communication network.

FIG. 1 is a schematic diagram of an example communication network 100 illustratively comprising network nodes/devices 200 (e.g., labeled as shown-200a-200g—and described in FIG. 2 below) such as mobile devices, tablets, computers, servers, cellular tower devices, etc., each interconnected by various methods of communication to communication network 100. For instance, the links 105 may be wired links or shared media (e.g., wireless links, PLC links, etc.) where certain nodes (e.g., node 200a) may be in communication with other nodes (e.g., node 200e), e.g., based on channel allocation, distance, signal strength, current operational status, location, etc. Those skilled in the art will understand that any number of nodes, devices, links, etc. may be used in the communication network, and that the view shown herein is for simplicity. Also, those skilled in the art will further understand that the network 100 is merely an example illustration that is not meant to limit the disclosure.

Data packets 140 (e.g., traffic and/or messages sent between the devices/nodes) may be exchanged among the nodes/devices of the communication network 100 using predefined network communication protocols such as the Transmission Control Protocol/Internet Protocol (TCP/IP), User Datagram Protocol (UDP), wireless protocols (e.g., IEEE Std. 802.15.4, WiFi, Bluetooth®, General Packet Radio Services (GPRS) protocols, Enhanced Data GSM Environment (EDGE) protocols, Universal Mobile Telecommunication Service (UMTS), Wideband Code-Division Multiple Access (WCDMA), High-Speed Downlink Packet Access (HSDPA), Evolution Data Maximized (EVDO), etc.), or other shared-media protocols where appropriate. In this context, a protocol consists of a set of rules defining how the devices interact with each other.

Figure 2:
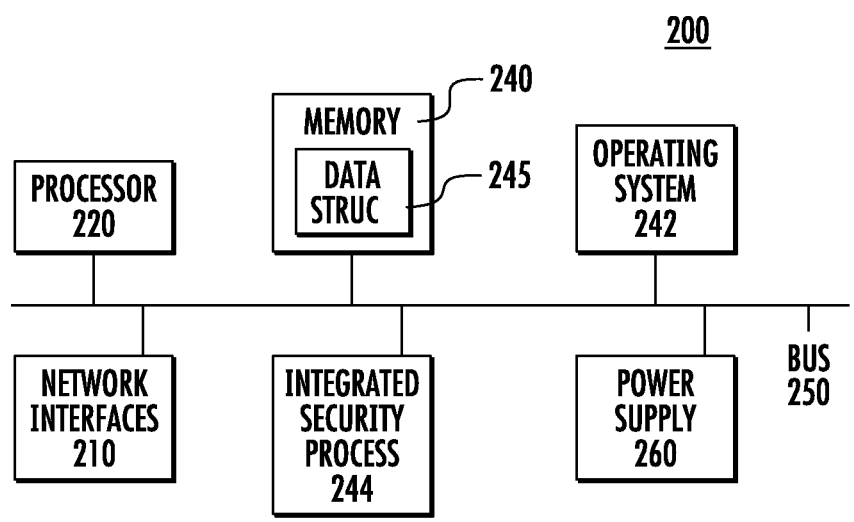
FIG. 2 is a block diagram of an exemplary network node/device of the communication network shown in FIG. 1.

FIG. 2 is a schematic block diagram of an example network node/device 200 that may be used with one or more embodiments described herein, e.g., as any of the devices 200 shown in FIG. 1 above. The network device may comprise one or more network interfaces 210 (e.g., wired, wireless, etc.), at least one processor 220, and a memory 240 interconnected by a bus 250, as well as an optional power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. The devices may have two different types of network connections 210, e.g., wireless (e.g., a mobile device, etc.) and wired/physical connections (e.g., a server, etc.), and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate one or more data structures 245 such as routes/prefixes, etc. An operating system 242, portions of which are typically resident in memory 240 and executed by the processor, functionally organizes the device by, inter alia, invoking operations in support of software processes and/or services executing on the device. These software processes and/or services may comprise an integrated security process/services 244. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Illustratively, the techniques described herein may be performed by hardware, software, and/or firmware, such as in accordance with the integrated security process 244, which may contain computer executable instructions executed by the processor 220 (or independent processor of interfaces 210) to perform functions relating to the techniques described herein.

As noted above, conventional security systems include various dead zones that do not include proper monitoring and although security service professionals have specialized recording equipment, such equipment is typically not mobile nor is it integrated with the conventional security systems. Accordingly, the techniques herein provide mechanisms that integrate streaming and recording mobile device video and audio using a central security server in a security-focused platform. Generally, the central security server receives incoming video and audio data from one or more mobile devices of a communication network, stores the video and audio data, and then broadcasts the video and audio data to additional mobile devices for subsequent display. The techniques herein also provide dynamic allocation of data channels to each mobile device according to one or more priority parameters to support mobile devices in excess of the number of total channels.

Figure 3:
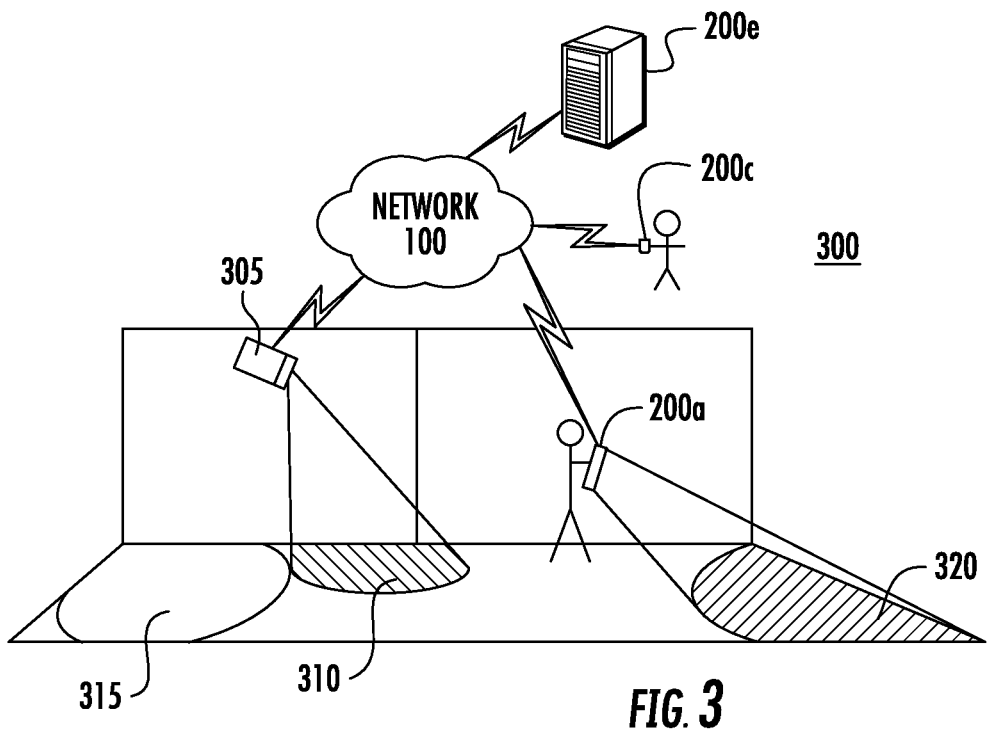
FIG. 3 is schematic diagram showing operation of an integrated security system according to one or more exemplary embodiments.

For example, referring to FIG. 3, a schematic diagram 300 illustrates operation of integrated security system according to one or more exemplary embodiments discussed herein. As discussed above, a hard-wired security camera 305 monitors a particular area 310, while other areas 315 include dead zones and remain poorly monitored. A security personnel such as an emergency responder, a security guard, etc., uses a mobile device 200a (e.g., a mobile phone, a tablet, a dedicated recording device, and the like) to supplement security camera 305 and provide coverage of the previously poorly monitored area 315. Operationally, mobile device 200a records and transmits video and audio data to security server 200e via a communication network 100. Security server 200e integrates the received video and audio from both security camera 305 and mobile device 200a into a comprehensive security feed, which can then be sent to another remote mobile device such as mobile device 200c. In some embodiments, when mobile device 200a cannot connect to network 100, it locally records audio and video data to resident hardware (e.g., data structures 245 of memory 240). Notably, although security 200e is depicted as a single network device, it is contemplated that in certain embodiments, that security server 200e can comprise multiple network devices. For example, the security server 200e can comprise a server that receives, decodes, encodes audio/video, a server that stores and broadcasts the audio/video, etc.

In certain other embodiments, the mobile devices (i.e., mobile device 200a and mobile device 200c) are controlled, in part, by a remote security server (i.e., security server 200e) or other remote network device. Such embodiments support the ability to remotely initiate video and audio streaming and/or recording on, for example, mobile device 200a from a monitoring command center (security server 200e). Such functionality allows an authorized officer in the monitoring center to initiate streaming and recording from any mobile device of other officer's without direct interaction from the officer. This is particularly adapted for when a field officer is not capable of interacting with their mobile device to initiate streaming. For example, the field officer may have both hands busy during an incident response, may need to remain discreet (e.g., duress situation), or may be incapacitated (e.g., a man down situation), rendering him unable to initiate streaming Certain authorized officers may, in these scenarios, initiate a command to the field officer's mobile device to initiate recording audio and video data without any user interaction.

Operationally, the security server first identifies a current Internet Protocol (IP) address of the field officer's device to remotely initiate audio and video streaming on the field officer's device. To identify the current IP address of the field officer's device, the field officer's device typically "pings" the security server with its current IP address any time its IP address changes (e.g., changing from WiFi to cellular network, device power off/on, lost connection to carrier, etc.). The ping message is specifically formatted and includes a device identifier, the user who is currently assigned to that device, and the resident IP address of the mobile device. Once identified, the security server transmits a specifically formatted command that is interpreted by the field officer's mobile device (e.g., via an application running on the mobile device) and initiates streaming with no interaction required by the device user. In this fashion, the mobile device can be commanded to record and/or stream audio and video data in a number of potentially life-threatening scenarios. For example, in an officer down scenario, the best information that the officers responding for backup is the eyes and ears of the incapacitated officer. The command center, via security server 200e, can send a command through that initiates video and audio streaming on the down officer's device thereby giving the monitoring or command center situational awareness, and giving responding officers, carrying a different mobile device 200c, eyes and ears on the scene.

Figure 4A:
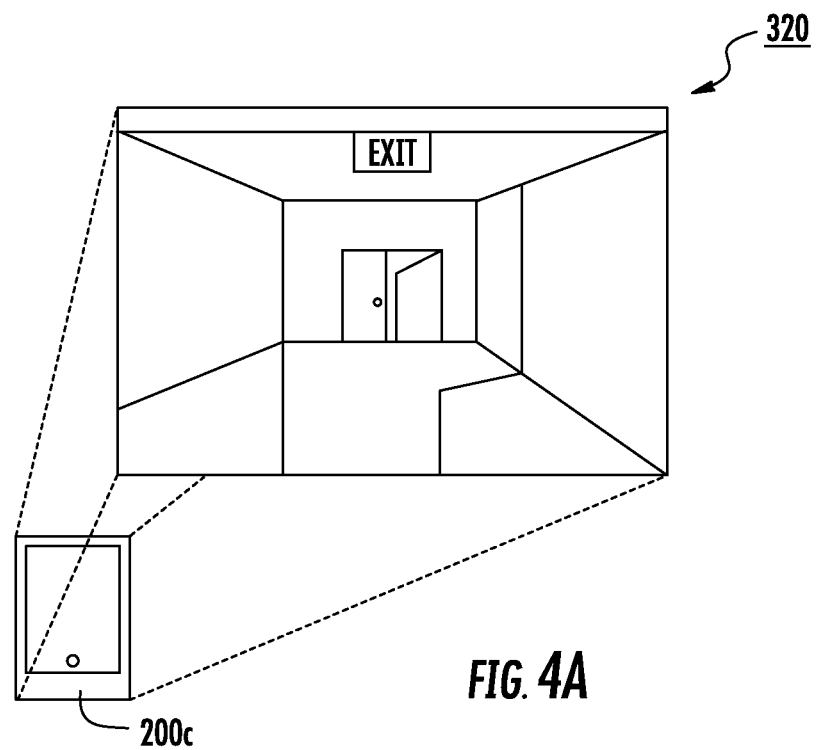
FIG. 4A schematically illustrates a mobile device displaying audio and video data for a monitored area.

Referring to FIG. 4A, mobile device 200c is shown displaying the audio and video data for area 320 captured by device 200a, shown in FIG. 3. As discussed above, mobile device 200a transmits audio and video data, via network 100, to security server 200e. Security server 200e, in turn, broadcasts the audio and video data to other mobile devices (i.e., mobile device 200c) for subsequent display. In this fashion, other security personnel are provided with additional coverage of an emergency scene.

Figure 4B:
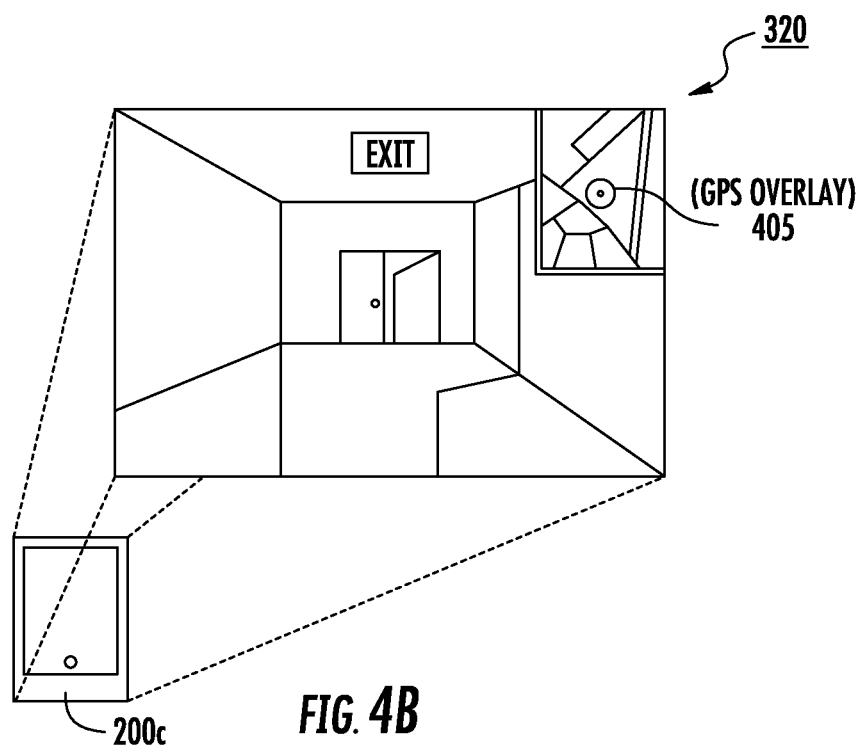
FIG. 4B schematically illustrates the mobile device of FIG. 4, showing the audio and video display of the monitored area and a map overlay.

Referring now to FIG. 4B, mobile device 200c is shown displaying the audio and video data for area 320 captured by device 200a with a map display 405 indicating Global Positioning System (GPS) coordinates of where the audio and video data was recorded. In certain embodiments, mobile devices such as mobile device 200a, are configured to include location data (e.g., GPS data, cellular triangulation data, Wifi location data, etc.) in addition to the video and audio data transmitted to security server 200e. Security server 200e uses the location data to overlay a map display 405 which illustrates the location of mobile device 200a when the video and audio data was recorded. This real-time injection of map 405 into the video and audio feed showing the exact location of mobile device 200a is extremely valuable real-time information for both officers in a monitoring center and for other officers in the field who may be watching and listening from their respective mobile devices. Notably, the location data can be used for real-time tracking of a mobile device that captures video data and/or audio data, as well as for post-event forensic analysis.

Figure 5:
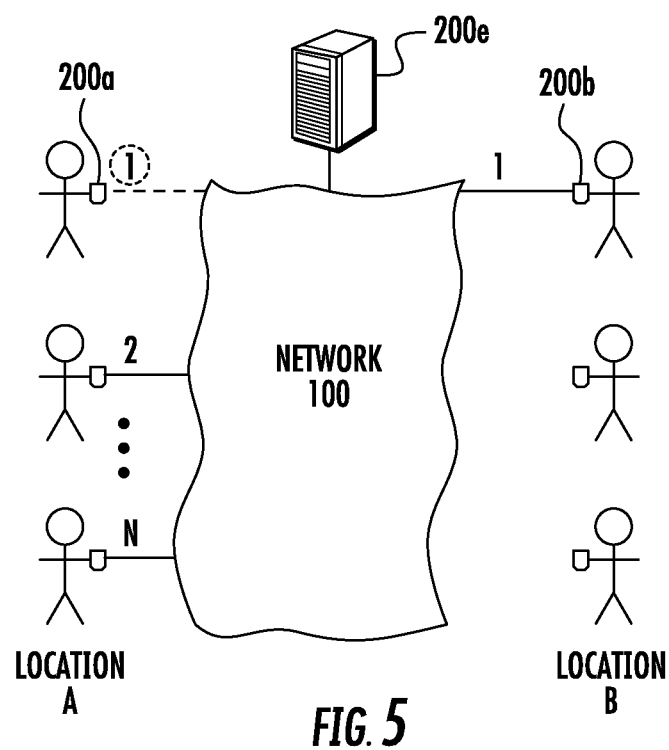
FIG. 5 illustrates one embodiment of an allocation schematic diagram, according to one or more location parameters.

With respect to the dynamic allocation of data channels to mobile devices 200 according to one or more priority parameters, FIG. 5 illustrates one embodiment of an allocation schematic diagram 500, according to one or more location parameters. As shown, security personnel in location A are assigned one of a plurality of available data channels 1-N by security server 200e. An emergency arises at location B, and channel 1 is re-assigned from mobile device 200a at location A to mobile device 200b at location B. In some embodiments, an alert is generated by security server 200e and transmitted to the other mobile devices having an allocated channel that a "new" mobile device is online and streaming data. Such alert can include the new device name/identifier and, in certain embodiments, may trigger the other mobile devices to display the streaming audio and video data. In this fashion, security server 200e can support more mobile devices than available security channels.

With respect to channel allocation, the security server 200e prioritizes allocation of channels based on a number of factors or parameters including network bandwidth, device specific information, device owner information (e.g., a position of a user in an organization such as first responders, response teams, supervisors, etc.), the user's specified priority of the current stream (e.g., assigning an emergency level), and the like. For example, a first responder's mobile device can be assigned a higher priority than an officer who is out on a routine perimeter patrol. The officer on patrol, however, can specify that the audio and video stream currently being sent is a high priority or critical stream because of an emergency situation. In this fashion, the officer on patrol can temporarily elevate a priority level of the mobile device's recording data and ensure a channel is allocated. Additionally, the allocation parameters can include event-driven priority elevation. For example, an officer provides his badge at a reader and signals he is in duress by use of a special personal identifier (e.g., a personal identification number (PIN)) thereby indicating an elevated priority level. This allows a person who is being forced to provide access under duress to notify a monitoring center while still being granted access and not alerting potentially adverse parties (e.g., aggressors). As another example, an officer wears a hardware device that is able to automatically indicate a man down scenario to detect when the officer has gone to a horizontal rather than vertical position and trigger an alarm and elevate the priority level. Further, as discussed above, the security server can automatically, or at the direction of an officer, assign a channel to a mobile device device and remotely initiate data streaming without intervention from the user. IN some embodiments, the security server can also assign one or more channels to officers in the proximity of a down-officer and likewise cause the corresponding mobile devices to remotely initiate data streaming Importantly, these parameters can each be used independently to determine a device stream's priority or they can be used in conjunction with each other to collectively determine the priority of a device stream.

The techniques described herein, therefore, provide integrated access to video and audio data for multiple monitoring devices. In particular, the techniques herein provide streaming coverage of previously unknown areas or dead zones. Moreover, a large number of mobile devices are supported even when using an allocation scheme of channels or licenses less than the number of mobile devices. That is, the channels or licenses are allocated amongst the mobile devices based on various parameters.

While there have been shown and described illustrative embodiments that provide for integrated access to video and audio data, it is to be understood that various other adaptations and modifications may be made within the spirit and scope of the embodiments herein. For example, the embodiments have been shown and described herein with relation to a single security server. However, the embodiments in their broader sense are not as limited, and may, in fact, be deployed amongst various other network devices. Additionally, although functions employed by the security server and the various mobile devices are discussed as independent, such functions can be employed interchangeably by any networked device. Moreover, while shown and described in the exemplary context of streaming and/or recording video and audio, those skilled in the art will readily appreciate that only video or only audio can also be used with the embodiments disclosed herein without departing from the scope of this disclosure. Further, while some of the exemplary embodiments discuss techniques for coordinating access and integrating streaming audio and/or video with respect to emergency responders, such techniques can be employed for various field operations (e.g., civilian and military operations).

The foregoing description has been directed to specific embodiments. It will be apparent, however, that other variations and modifications may be made to the described embodiments, with the attainment of some or all of their advantages. For instance, it is expressly contemplated that the techniques described herein can be implemented as software being stored on a tangible (non-transitory) computer-readable medium (e.g., disks/CDs/RAM/EEPROM/ etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed:

1. A method, comprising:
   determining, via a security server, a number of available channels for a plurality of mobile devices in a communication network;
   allocating, via the security server, one channel of the available channels to one of the mobile devices based on at least one priority parameter, and remotely initiating steaming on the one mobile device;
   receiving data including at least one of audio data and video data from the one mobile device over the one channel;
   allocating, via the security server, one or more channels to one or more additional mobile devices in proximity to the one mobile device and remotely initiating streaming from the one or more additional mobile devices; and
   broadcasting the audio data and/or the video data from the one mobile device and from the one or more additional mobile devices to at least one different device of the plurality of mobile devices configured to display the audio data and/or the video data, wherein the security server is configured to support more mobile devices than the number of available channels, wherein at least one of the mobile devices both streams video out, and receives and displays incoming video wherein the incoming video is streamed from at least another one of the mobile devices, wherein each video stream uses one of the available channels, wherein there are more mobile devices connected to the security server than there are video streams using the channels.

2. The method of claim 1, wherein the priority parameter is one of at least a location, a user-specified priority, a position of a user in an organization, a bandwidth of the communication network, an emergency code, and an event-driven priority elevation.

3. The method of claim 1, further comprising:
   deallocating the one channel from the one mobile device to cause the one mobile device to store audio data and/or video data locally.

4. The method of claim 1, further comprising:
   transmitting a recording command from the security server to the one mobile device to cause the one mobile device to record and transmit the audio data and/or video data to the security server.

5. The method of claim 1, wherein receiving data further comprises receiving global positioning system (GPS) data, wherein transmitting the audio data and/or video data includes transmitting the audio data and/or video data to the at least one different device to cause the at least one different device to display the audio data and/or video data with a map overlay displaying the GPS data.

6. An apparatus, comprising:
   one or more network interfaces of a security server adapted to communicate in a communication network;
   a processor adapted to execute one or more processes; and
   a memory configured to store a process executable by the processor, the process when executed operable to:
     determine a number of available channels for a plurality of mobile devices in the communication network;
     allocate one channel of the available channels to one of the mobile devices based on at least one priority parameter and remotely initiate streaming on the one mobile device;
     receive data including at least at least one of audio data and video data from the one mobile device over the one channel;
     allocate one or more channels to one or more additional mobile devices in proximity to the one mobile device and remotely initiate streaming from the one or more additional mobile devices; and
     broadcast the audio data and/or video data from the one mobile device and from the one or more additional mobile devices to at least one different mobile device, wherein the security server is configured to support more mobile devices than the number of available channels, wherein at least one of the mobile devices both streams video out, and receives and displays incoming video wherein the incoming video is streamed from at least another one of the mobile devices, wherein each video stream uses one of the available channels, wherein there are more mobile devices connected to the security server than there are video streams using the channels.

7. The apparatus of claim 6, wherein the priority parameter is one of at least a location, a user-specified priority, a position of a user in an organization, a bandwidth of the communication network, an emergency code, and an event-driven priority elevation.

8. The apparatus of claim 6, wherein the process, when executed, is further operable to:
deallocate the one channel from the one mobile device to cause the one mobile device to store audio data and/or video data locally.

9. The apparatus of claim 6, wherein the process, when executed, is further operable to:
transmit a recording command from the security server to the one mobile device to cause the one mobile device to record and transmit the audio data and/or video data to the security server.

10. The apparatus of claim 6, wherein the process, when executed to receive data is further operable to receive global positioning system (GPS) data, wherein the process to transmit the audio data and/or video data, when executed, is further operable to transmit the audio data and/or video data to the at least one different mobile device to cause the at least one different mobile device to display the audio data and/or video data with a map overlay displaying the GPS data.

11. A tangible, non-transitory, computer-readable media having software encoded thereon, the software, when executed by a processor, operable to:
determine a number of available channels for a plurality of mobile devices in a communication network;
allocate one channel of the available channels to one of the mobile devices based on at least one priority parameter and remotely initiate streaming on the one mobile device;
receive data including at least one of audio data and video data from the one mobile device over the one channel;
allocate one or more channels to one or more additional mobile devices in proximity to the one mobile device and remotely initiate streaming from the one or more additional mobile devices; and
broadcast the audio data and/or video data from the one mobile device and from the one or more additional mobile devices to at least one different mobile device, wherein the processor is configured to support more mobile devices than the number of available channels, wherein at least one of the mobile devices both streams video out, and receives and displays incoming video wherein the incoming video is streamed from at least another one of the mobile devices, wherein each video stream uses one of the available channels, wherein there are more mobile devices connected to the security server than there are video streams using the channels.

12. The apparatus of claim 11, wherein the priority parameter is one of at least a location, a user-specified priority, a position of a user in an organization, a bandwidth of the communication network, an emergency code, and an event-driven priority elevation.

13. The apparatus of claim 11, wherein the software, when executed by the processor, is further operable to:
deallocate the one channel from the one mobile device to cause the one mobile device to store audio data and/or video data locally.

14. The apparatus of claim 11, wherein the software, when executed by the processor, is further operable to:
transmit a recording command from the security server to the one mobile device to cause the one mobile device to record and transmit the audio data and/or video data to the security server.

15. The apparatus of claim 11, wherein the process, when executed by the processor to receive data is further operable to receive global positioning system (GPS) data, wherein the process to transmit the audio data and/or video data, when executed by the processor, is further operable to transmit the audio data and/or video data to the at least one different mobile device to cause the at least one different mobile device to display the audio data and/or video data with a map overlay displaying the GPS data.

* * * * *